Aug. 5, 1941.   J. T. A. WILLIAMS   2,251,310
TWO-PART WHEEL FOR VEHICLES
Filed June 17, 1940   2 Sheets-Sheet 1
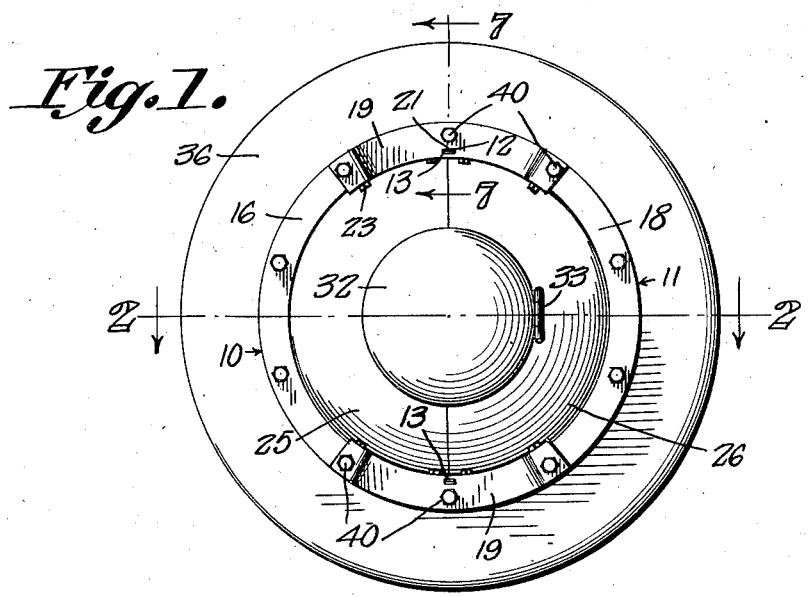
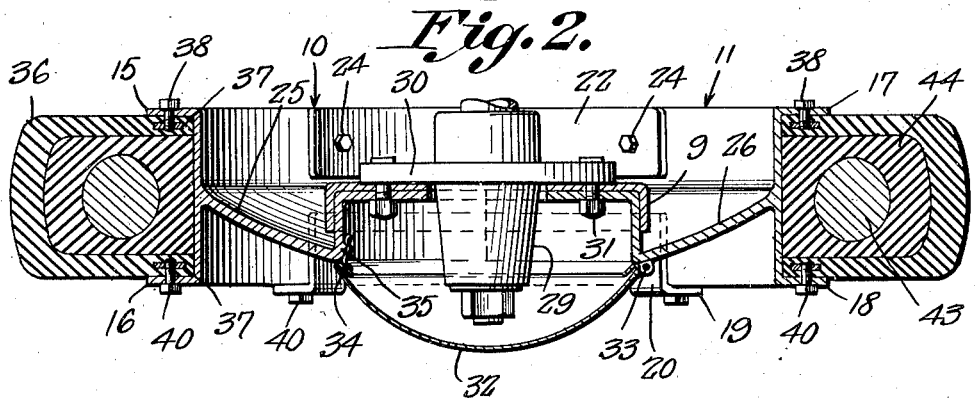
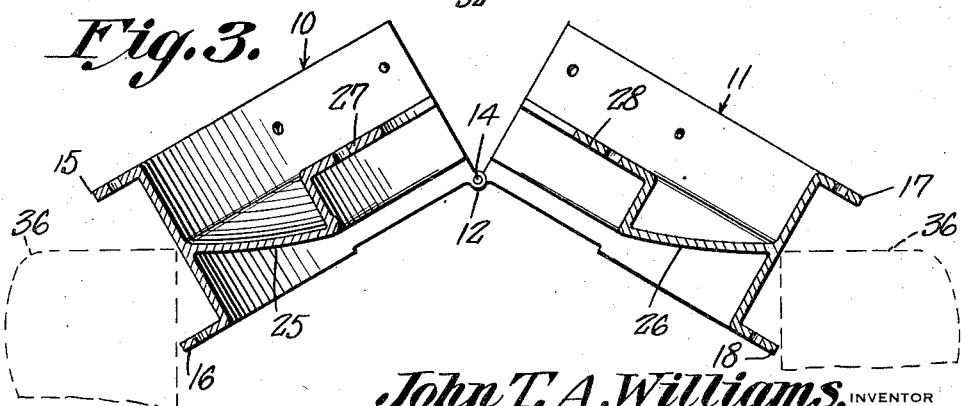
John T. A. Williams, INVENTOR Aug. 5, 1941. J. T. A. WILLIAMS 2,251,310
TWO-PART WHEEL FOR VEHICLES
Filed June 17, 1940 2 Sheets-Sheet 2
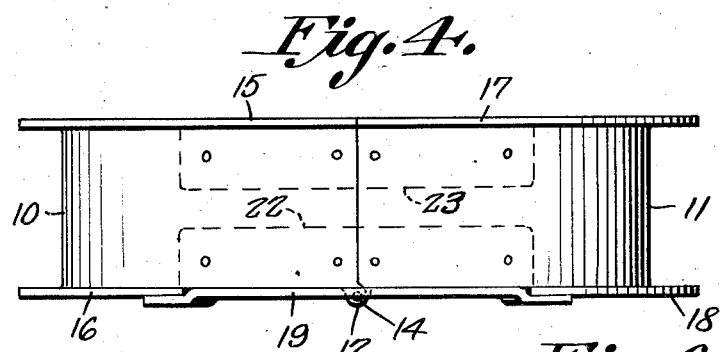
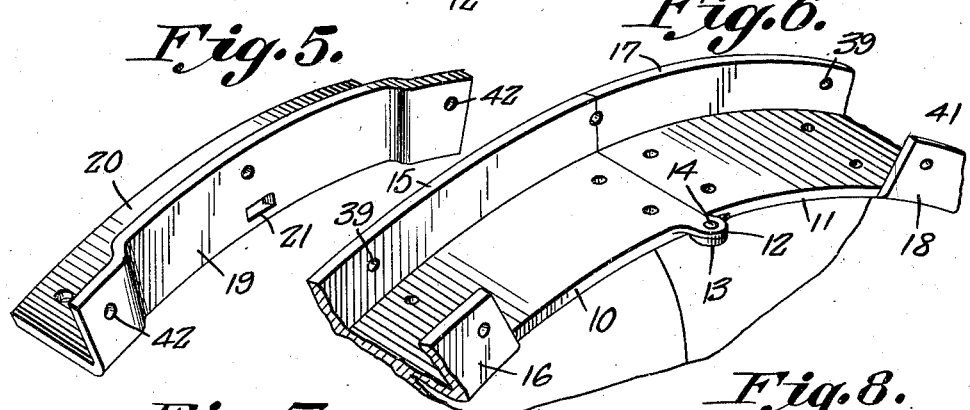
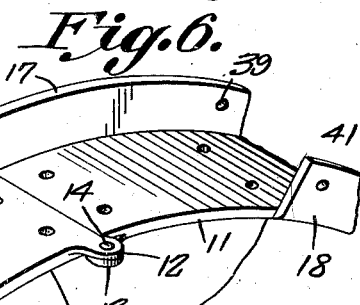
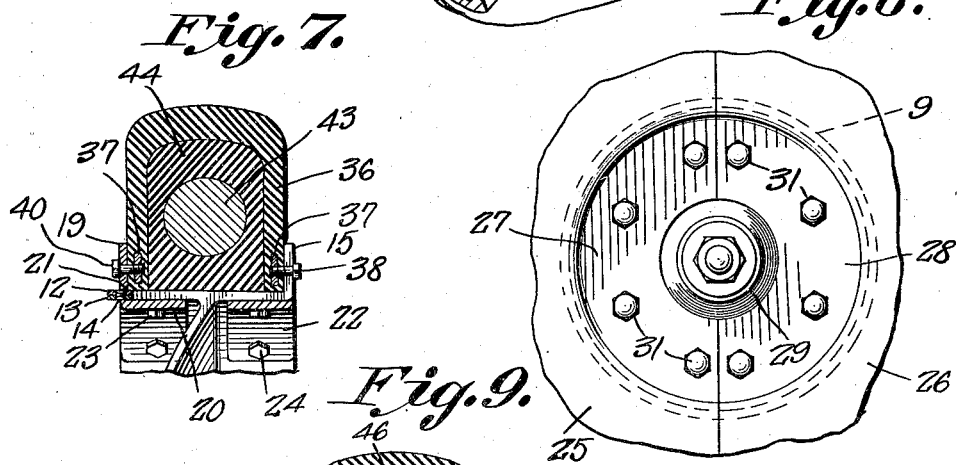
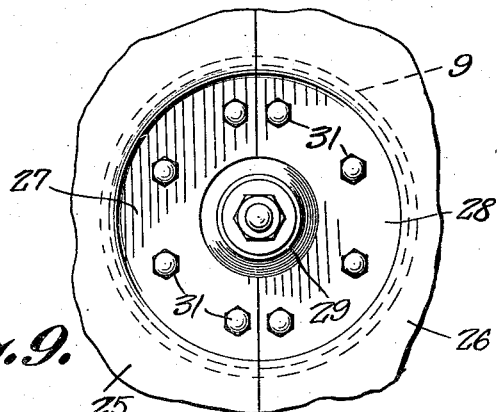
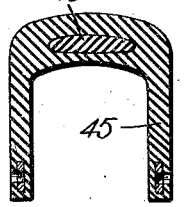
John T. A. Williams, INVENTOR
BY Victor J. Evans & Co. ATTORNEYS Patented Aug. 5, 1941

2,251,310

UNITED STATES PATENT OFFICE 2,251,310

TWO-PART WHEEL FOR VEHICLES

John T. A. Williams, New Orleans, La.

Application June 17, 1940, Serial No. 341,059

4 Claims. (Cl. 301—9)

This invention relates to a two-part wheel for vehicles and has for an object to provide a device of this character which may be formed of two oppositely disposed sections hinged together at diametrically opposite points so that the wheel may be folded on a median line passing through the center of the wheel to promote easy removal and application of a tire thereto.

A further object is to provide a wheel of this type having removable plates for reinforcing the hinges against buckling under severe conditions of service, the plates being provided with openings through which the hinges project to prevent any tendency of circumferential displacement of the hinges.

A further object is to provide a device of this character having a reinforcing cup superposed upon the hub receiving cup of the wheel for co-acting with the removable plates in preventing accidental displacement of the sections of the wheel relatively to each other.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a side elevation of a vehicle wheel constructed in accordance with the invention.

Figure 2 is a longitudinal sectional view of the vehicle wheel taken on the line 2—2 of Figure 1.

Figure 3 is a sectional view of the wheel with the tire removed and showing the sections thereof rocked open.

Figure 4 is a plan view of the wheel with the tire removed and showing one of the removable plates in position to house the respective hinge.

Figure 5 is a perspective view of one of the removable plates of each pair of rim sections, the same being substantially right angular in cross section.

Figure 6 is a fragmentary perspective view showing the side flanges of the rim of the wheel, one of the side flanges being cut away to receive the respective removable plate, the latter having its ends overlapped on the cut away flange.

Figure 7 is a detail cross sectional view showing the tire and rim of the wheel taken on the line 7—7 of Figure 1 and showing the removable plates.

Figure 8 is a fragmentary side elevation of the hub portion of the wheel showing the securing screws thereof.

Figure 9 is a detail cross sectional view of a modified form of tire casing showing a highly flexible band of rubber indented in the tread portion to function as a shock absorber.

Referring now to the drawings in which like characters of refernce designate similar parts in the various views, the wheel comprising the subject matter of this invention comprises two half sections 10 and 11 co-acting to form an annular rim, the sections being provided at diametrically opposite points with apertured juxta-posed ears 12 and 13 through which pivot pins 14 are passed to hinge the sections together on one side of the rim so that the sections may be rocked open on the hinges to the position shown in Figure 3.

The rim section 10 is provided with side flanges 15 and 16 and the rim section 11 is provided with side flanges 17 and 18. The side flanges 16 and 18, moreover, are cut away on opposite sides of the pivot pin 14, as best shown in Figure 6, to provide a space through which the hereinafter described tire may be disposed on the rim when the rim sections are moved from the open position shown in Figure 3 to the closed position shown in Figure 4.

The cut away portions of the side flanges 16 and 18, at diametrically opposite points of the wheel, are normally closed by side plates one of which is shown in Figure 5 and which comprises a flange 19 and an arcuate base 20. The flange 19 is offset inward and is provided with an elongated opening 21 to receive the hinge ears 12 and 13. These right angular plates are disposed on the same side of the wheel, whether it be the inside or the outside being immaterial.

The rim sections 10 and 11 of the wheel are reinforced transversely from the base 20 of the removable plates by arcuate plates 22, one of which is shown in Figure 7. The removable plates and the arcuate plates prevent the sections of the wheel from being accidentally displaced from each other and are normally bolted in place by respective bolts 23 and 24 passed through the rim sections of the wheel as also shown in Figure 7.

By referring to Figures 1 and 2 it will be seen that two half disks 25 and 26 are welded or otherwise secured at their outer peripheral edges to the respective rim portions 10 and 11 of the wheel. The half disks of course swing open with their respective rim section, as best shown in Figure 3.

Formed integral with the disk sections 25 and 26 are companion cup sections 27 and 28 which receive the hub 29 of a motor vehicle axle and these cup sections are secured to the wheel mounting flange 30 of the axle by bolts 31, as best shown in Figure 2. A hub cap 32 is hinged at one side to the disk section 26, as shown at 33, and is provided at the opposite side with a locking spring finger 34 which engages a keeper 35 formed on the other disk section 25, as best shown in Figure 2. The hub cap being thus hinged cannot at any time fall from place.

A cup 9 formed of a single blank of metal is interposed between the sectional cup sections 27 and 28 and the wheel mounting flange 30 of the hub and is secured in plate by the said bolts 31 which secure the cup sections 27 and 28 in place. The cup 9 prevents the cup sections 27 and 28 from displacement relatively to each other.

The wheel is adapted to be equipped with a tire of the solid type comprising a straight-walled casing 36, best shown in Figure 7, having imbedded at intervals near the inner periphery of the wall metal anchor plates 37. The screws 38 are engaged through openings 39 in the flanges 15 and 17 and are threadedly engaged in openings in the anchor plates. Similar screws 40 are engaged through openings 41 in the flanges 16 and 18 and are threadedly engaged in openings in the anchor plates 37 on the adjacent side of the tire casing. It will be pointed out that certain of the above-mentioned openings 41 aline with openings 42 formed in the offset ends of the flanges 19 of the annular plates and the same screws 40 which are engaged through the openings 41 are engaged through the openings 42 to removably attach the annular plates to the cut away portions of the rim flanges 16 and 18.

A solid annular core 43 is mounted concentrically in the tire casing and a resilient envelope 44 of a good grade of rubber is sleeved on the core and acts as a shock absorbing cushion in the space between the tire casing 36 and the rigid core 43.

In some instances the tire casing may be modified as shown in Figure 9, in which the straight-walled tire casing 45 is provided in the tread portion with an insert 46 formed of a good grade of highly resilient rubber to lend flexibility to the tread portion of the casing.

From the above description it is thought that the construction and operation of the invention will be fully understood without further explanation.

What is claimed is:

1. A two-part wheel for vehicles comprising oppositely disposed sections hingedly connected together at diametrically opposite points to permit the wheel being folded on a median line passing through the center of the wheel, removable plates on the sections reinforcing the same at the hinged portions against buckling under severe conditions of service, a half cup on each section of the wheel coacting to form a completed hub receiving cup when the sections are closed, and a reinforcing cup superposed upon the hub receiving cup coacting with the hub receiving cup for preventing accidental displacement of the sections of the wheel relatively to each other.

2. A motor vehicle wheel comprising a pair of companion rim sections hingedly connected together at diametrically opposite points on one side thereof, companion disk sections formed integral with respective rim sections, companion cup sections integral with the disk sections and adapted to be secured to an axle, a locking cup formed of a single piece disposed astride of said cup sections for preventing accidental opening of the sections, said rim sections having side flanges, plates removably secured to the rim sections for holding the rim sections closed, removal of said plates and said cup member permitting the sections to be rocked open, and a tire mounted on said rim sections between the flanges thereof.

3. A motor vehicle wheel comprising a pair of companion rim sections hingedly connected together at diametrically opposite points on one side thereof, companion disk sections integral with respective rim sections, companion cup sections integral with the disk sections and adapted to receive a hub, a locking cup formed of a single piece disposed astride of said cup sections for preventing accidental opening of the sections, threaded members and nuts for removably securing the cup sections and the locking cup to a hub, plates removably secured to the rim sections for holding the rim sections closed, removal of said plates and said nuts permitting the locking cup and cup sections being detached from the hub so that the rim sections may be rocked open, and a tire on the rim sections.

4. A motor vehicle wheel comprising a pair of companion rim sections hingedly connected together at diametrically opposite points on one side thereof, companion disk sections integral with respective rim sections, companion cup sections integral with the disk sections and adapted to receive a hub, a locking cup formed of a single piece disposed astride of said cup sections for preventing accidental opening of the sections, means for removably securing the cup sections and the locking cup to a hub, said rim sections having side flanges, plates removably secured to the rim sections for holding the side flanges closed, removal of said plates and said cup member permitting the sections to be rocked open, and a tire on the rim sections between the side flanges.

JOHN T. A. WILLIAMS.